US006499295B1

(12) United States Patent
Dantlgraber

(10) Patent No.: US 6,499,295 B1
(45) Date of Patent: Dec. 31, 2002

(54) HYDRO-TRANSFORMER

(75) Inventor: Jorg Dantlgraber, Lohr (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

(21) Appl. No.: 09/762,186

(22) PCT Filed: Jul. 20, 1999

(86) PCT No.: PCT/DE99/02238

§ 371 (c)(1),
(2), (4) Date: Apr. 9, 2001

(87) PCT Pub. No.: WO00/08339

PCT Pub. Date: Feb. 17, 2000

(30) Foreign Application Priority Data

Aug. 6, 1998 (DE) ........................................ 198 35 676
Sep. 29, 1998 (DE) ........................................ 198 44 648

(51) Int. Cl.[7] ................................................ F16D 31/02
(52) U.S. Cl. ............................. 60/459; 60/414; 60/328
(58) Field of Search .......................... 60/414, 415, 416, 60/328, 459, 462, 463, 465, 477; 91/1, 459

(56) References Cited

U.S. PATENT DOCUMENTS 4,274,474 A * 6/1981 Bergkvist ................. 60/464 X
4,548,296 A 10/1985 Hasegawa
4,625,513 A * 12/1986 Glomeau .................. 60/415 X
4,819,429 A 4/1989 Kordak
5,505,043 A * 4/1996 Baginski et al. .............. 60/477
5,511,368 A * 4/1996 Kocher ....................... 56/15.2
5,522,212 A * 6/1996 Kubik ......................... 60/414
5,794,437 A * 8/1998 Lisniansky ................... 60/414
5,794,438 A * 8/1998 Lisniansky ................ 60/414 X
5,794,439 A * 8/1998 Lisniansky ................... 60/414
5,794,440 A * 8/1998 Lisniansky ................... 60/414
5,794,441 A * 8/1998 Lisniansky ................... 60/414
5,794,442 A * 8/1998 Lisniansky ................... 60/414
5,862,663 A * 1/1999 Lanza et al. ............. 60/477 X
6,085,520 A * 7/2000 Kohno ........................ 60/414
6,116,138 A * 9/2000 Achten ...................... 60/419 X
6,145,307 A * 11/2000 Dantlgraber .............. 60/414 X
6,223,529 B1 * 5/2001 Achten ........................ 60/416
6,279,317 B1 * 8/2001 Morgan ....................... 60/413

FOREIGN PATENT DOCUMENTS

DE 38 05 290 A1 2/1988
DE 43 25 636 A1 7/1993
DE 44 16723 A1 5/1994
DE 195 21 102 A1 6/1995

* cited by examiner

*Primary Examiner*—John E. Ryznic
(74) *Attorney, Agent, or Firm*—Oliff & Berridge, PLC

(57) ABSTRACT

The present invention relates to a hydro-transformer including a hydraulic machine, a switching valve and a control means. A work port of the switching valve, which may optionally be connected hydraulically with a pressure port of the switching valve or a drain port of the switching valve, is connected with a first port of the hydraulic machine. The second port of the hydraulic machine is in hydraulic connection with a drive member. The switching valve is driven by the control means in response to a signal characterizing the volume flow into the hydraulic machine. Where the driver member is a cylinder, its extension may be carried out at a constant velocity and independently of a load, and energy may be recovered upon retraction. Due to the provision of a further switching valve between the second part of the hydrostatic motor and the drive member, a higher pressure may be generated at the drive member in the presence of a low pressure at the pressure port of the switching valve.

13 Claims, 4 Drawing Sheets

HYDRO-TRANSFORMER

Figure 1:
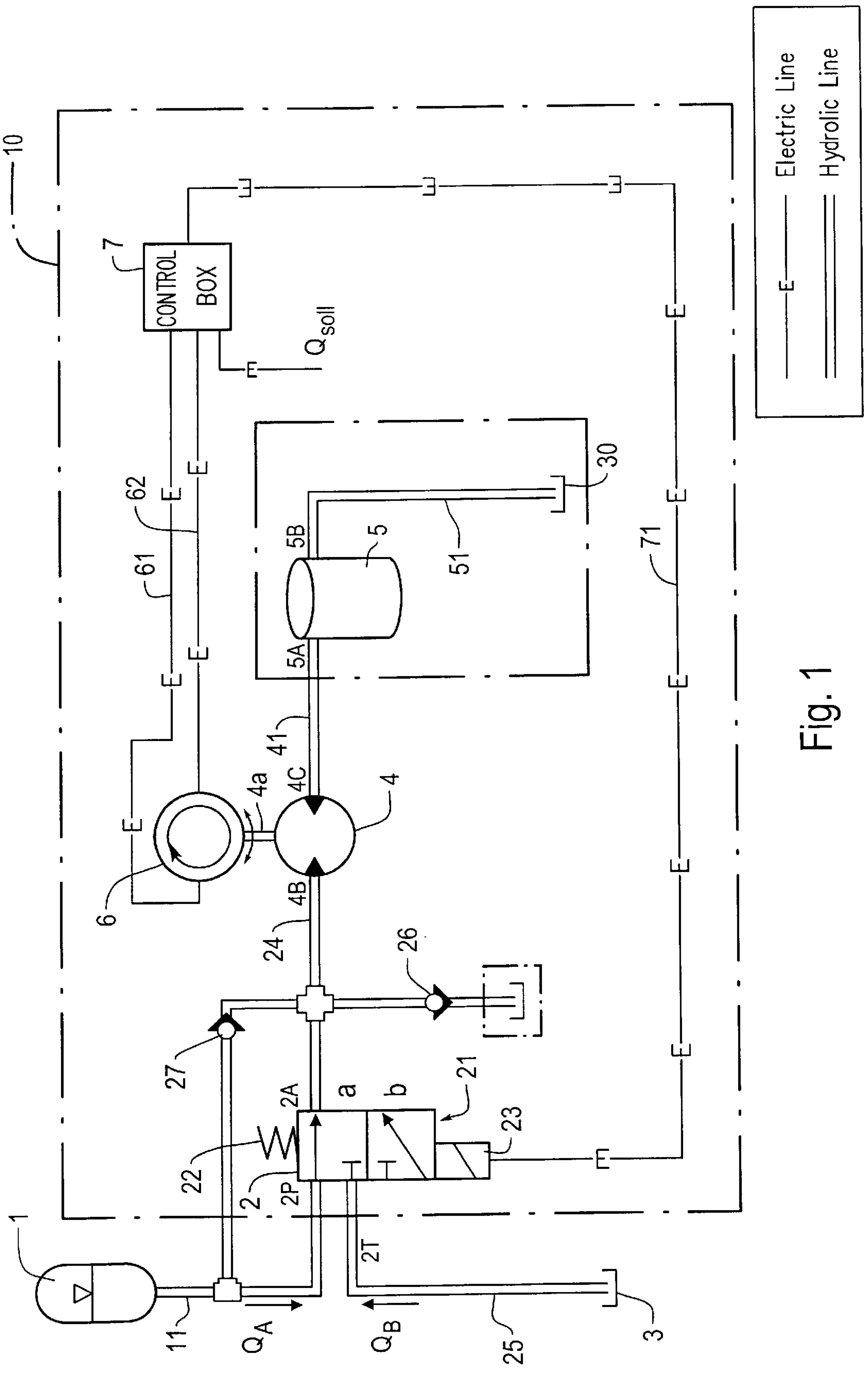

The present invention relates to hydro-transformers whereby one drive member or several drive members are supplied with fluid from means for outputting hydraulic energy.

From the prior art as represented in "Hydrostatische Antriebe mit Sekundärregelung, Der Hydraulik Trainer Band 6", Vogel-Buchverlag Würzburg, 1989, hydro-transformers are known to present a fixed displacement unit hydraulically connected with the drive member and a variable displacement unit hydraulically connected with the impressed-pressure system. The fixed displacement unit is a means having the function of fixed displacement pump/fixed displacement motor, whereas the variable displacement unit is a secondary-control means having the function of variable displacement pump/variable displacement motor. The shafts of the fixed displacement unit and of the variable displacement unit are mechanically coupled with each other.

If a cylinder with a unilaterally acting load is used as a drive member, use of a hydro-transformer has the purpose of realizing predetermined cylinder velocities upon extension and upon retraction of the cylinder independently of cylinder load, and the occurrence of lower losses.

In operation of a like conventional hydro-transformer, for extension of the cylinder the rotational speeds of the connected shafts of variable displacement unit and fixed displacement unit are therefore predetermined, and a rotational speed control is performed through adaptation of the stroke volume of the variable displacement unit. The fixed displacement unit herein operates as a pump, and the variable displacement unit as a motor. Upon retraction of the cylinder, on the other hand, the variable displacement unit operates as a pump and the fixed displacement unit operates as a motor, with rotational speed control concurrently also taking place. Moreover the variable displacement unit effects a recovery of energy which is fed into the impressed-pressure system. The rotational speed control may be carried out both hydraulically, such as in patent specification U.S. Pat. No. 4,819,429, or electronically during extension and retraction of the cylinder.

Conventional hydro-transformers have the drawback of necessitating high expenditure in terms of apparatus technology for their application, for which reason they are primarily employed in the upper power range such as, e.g., in large-size excavators.

The drawbacks of the prior art are to be overcome by the present invention.

The present invention thus has the object of furnishing a hydro-transformer whereby predetermined volume flows are achieved at a drive member independently of the load on this drive member, energy recovery from the drive member is possible, expenditure in terms of apparatus technology is lower than in conventional hydro-transformers, and a favorable efficiency is attained.

This object is achieved through a hydro-transformer in accordance with claim 1.

What is provided is a hydro-transformer including any type of hydraulic machine, one port of which may optionally be connected hydraulically with a pressure line through a work port of the switching valve and which preferably is a gear motor. The other port of the hydraulic machine is hydraulically connected with a hydraulic line leading to a drive member. The switching valve is controlled through a control means in accordance with a measured characteristic value which characterizes the volume flow of the hydraulic machine. Herein the work port is optionally connected with the pressure port or with a port at which a lower pressure prevails than in the hydraulic machine. In a case where the drive member is a cylinder, the latter may thus be extended in accordance with the volume flow. When the cylinder is retracted, on the other hand, fluid may be conveyed into the pressure line in accordance with the volume flow, resulting in energy recovery. On account of the low expenditure in terms of apparatus technology, the range of application of hydro-transformers may be expanded substantially.

It is advantageous if driving of the switching valve is performed in such a way that the characteristic value characterizing the volume flow is substantially constant. Thus a cylinder may be extended and retracted at a constant velocity independent of a load.

As a characteristic value for the volume flow it is possible to utilize the rotational speed of the hydraulic machine. Thus a measurement value must be determined which may be tapped simply and cost-effectively, whereby the cost for the hydro-transformer is influenced favorably.

It is furthermore advantageous to optionally connect the one port of the hydraulic machine via the switching valve, in a first switching position, with the pressure line or, in a second switching position, with a drain line, for the relatively high volume flow into the drain line results in short switching periods of the hydro-transformer according to the invention.

Although with the aid of the present invention it is possible to also effect extension of a cylinder as a drive member exclusively, it is favorable to use a hydraulic machine having two volume flow directions and two directions of rotation, for in this way energy transmitted to the fluid during retraction of the cylinder may be partly recovered.

If, e.g., a pressure present in the pressure line is twice as high as the one at the drive member, the switching valve should be actuated in such a way that the switching valve will remain in the first position for the same duration of time as in the second position.

Moreover between the other port of the hydraulic machine and the line leading to the drive member, another switching valve may be provided which is capable of optionally switching the hydraulic connection between hydraulic machine and drive member. Hereby it is possible to supply fluid through a pressure line having a lower pressure to a drive member having a higher pressure.

Preferably the further switching valve is switchable in such a way that the drive member will be in hydraulic connection either with the hydraulic machine or with the drain line. In order to avoid cavitation, it is sensible to bias the pressure in the drain line. For the same reason an anti-cavitation valve may be provided. The large difference between the pressure in the drain line and the one in the hydraulic machine brings about high responsiveness of the hydro-transformer in accordance with the invention.

A high clock frequency at a low volume flow in the pressure line reduces pulsation at the drive member, while the switching loss is kept low in the pressure line by means of a low clock frequency at high volume flow. Clock frequencies above or below a predetermined value should therefore be selected depending on an increase above or a drop below a predetermined volume flow.

The attenuation behavior of the hydraulic machine may be improved by rotation symmetrically attaching an additional mass to its shaft. Owing to the higher moment of inertia, a low clock frequency at a high volume flow is supported. In this way the switching losses are reduced.

The hydro-transformer according to the invention is preferably employed in mobile hydraulics. Thus a costefficient hydro-transformer is now also available in mobile hydraulics, thus rendering control of a drive member nearly independent of the presence of an accurately determined pressure level in the pressure line. As a result, lightweight and low-cost hydrostatic accumulators may be employed in mobile hydraulics to a larger extent.

Further developments of the present invention are the subject matters of the remaining subclaims.

Figure 2:
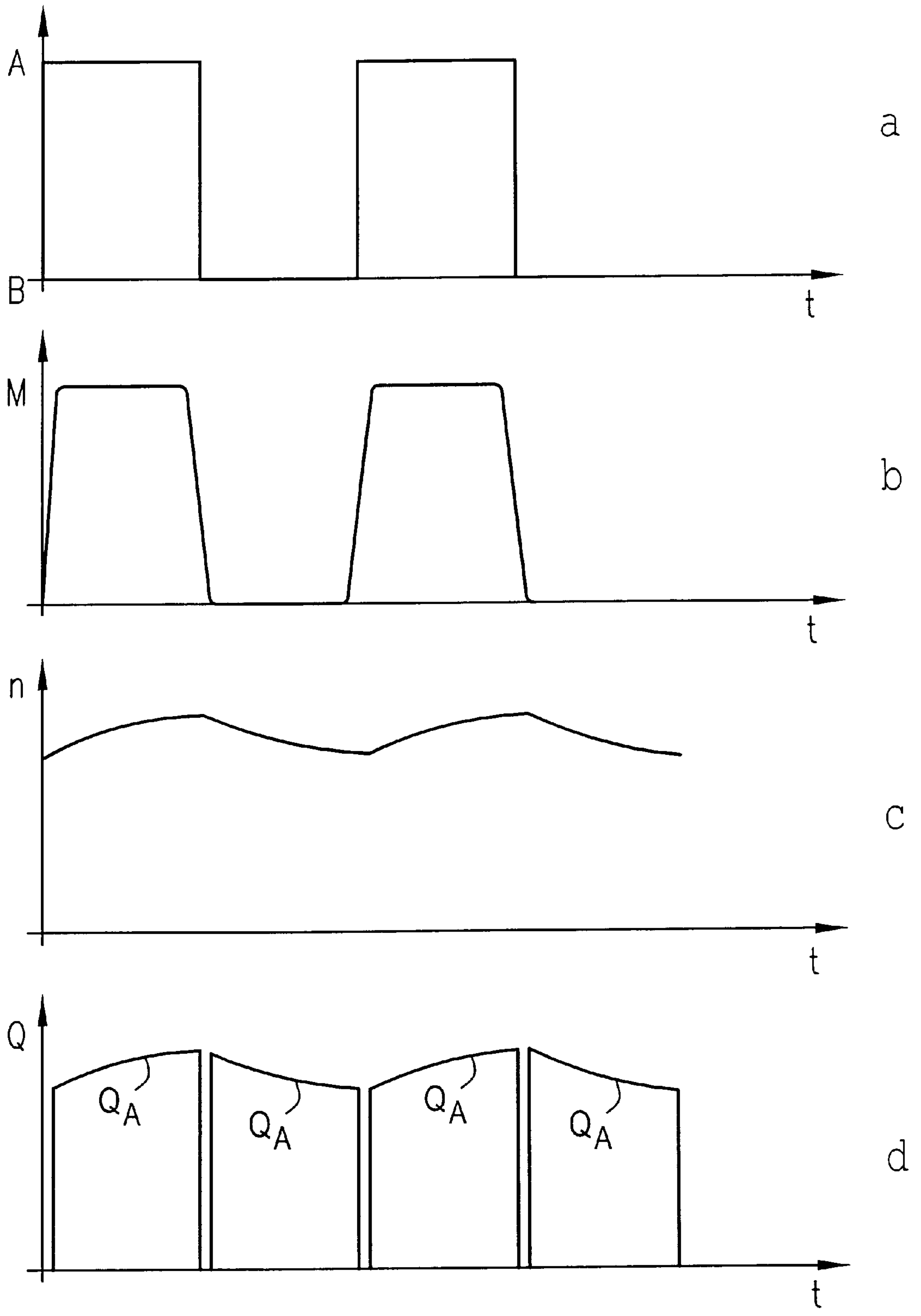
Figure 3:
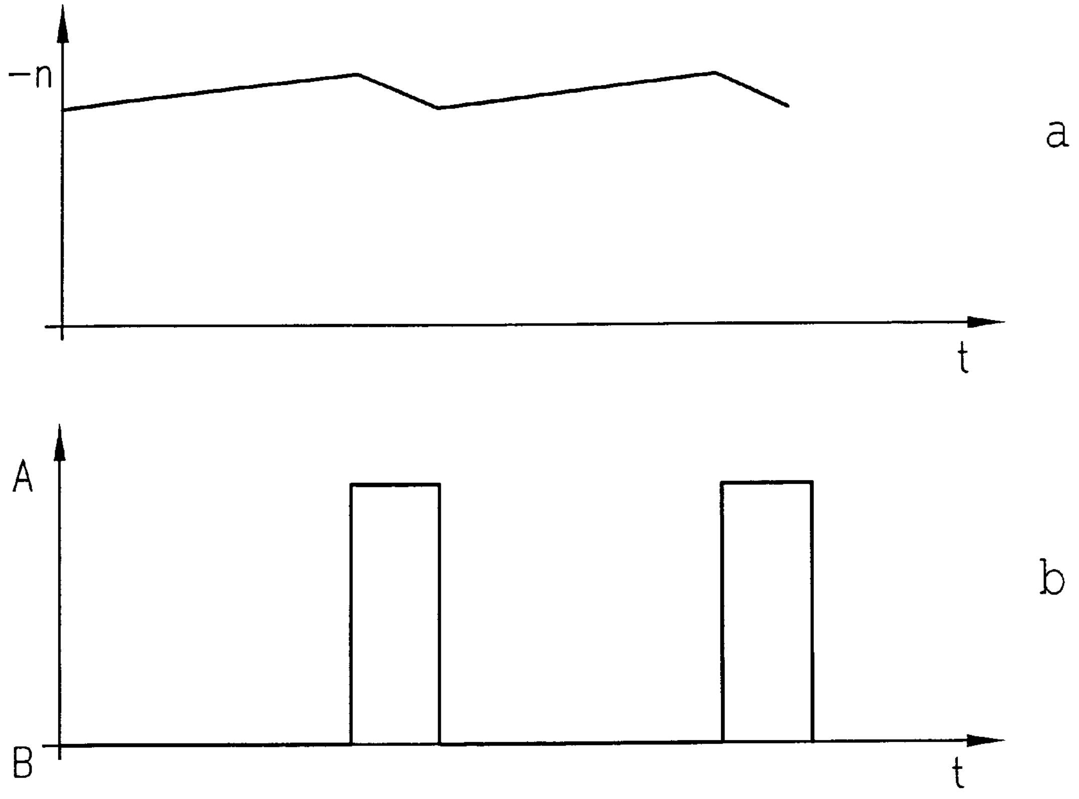
Figure 4:
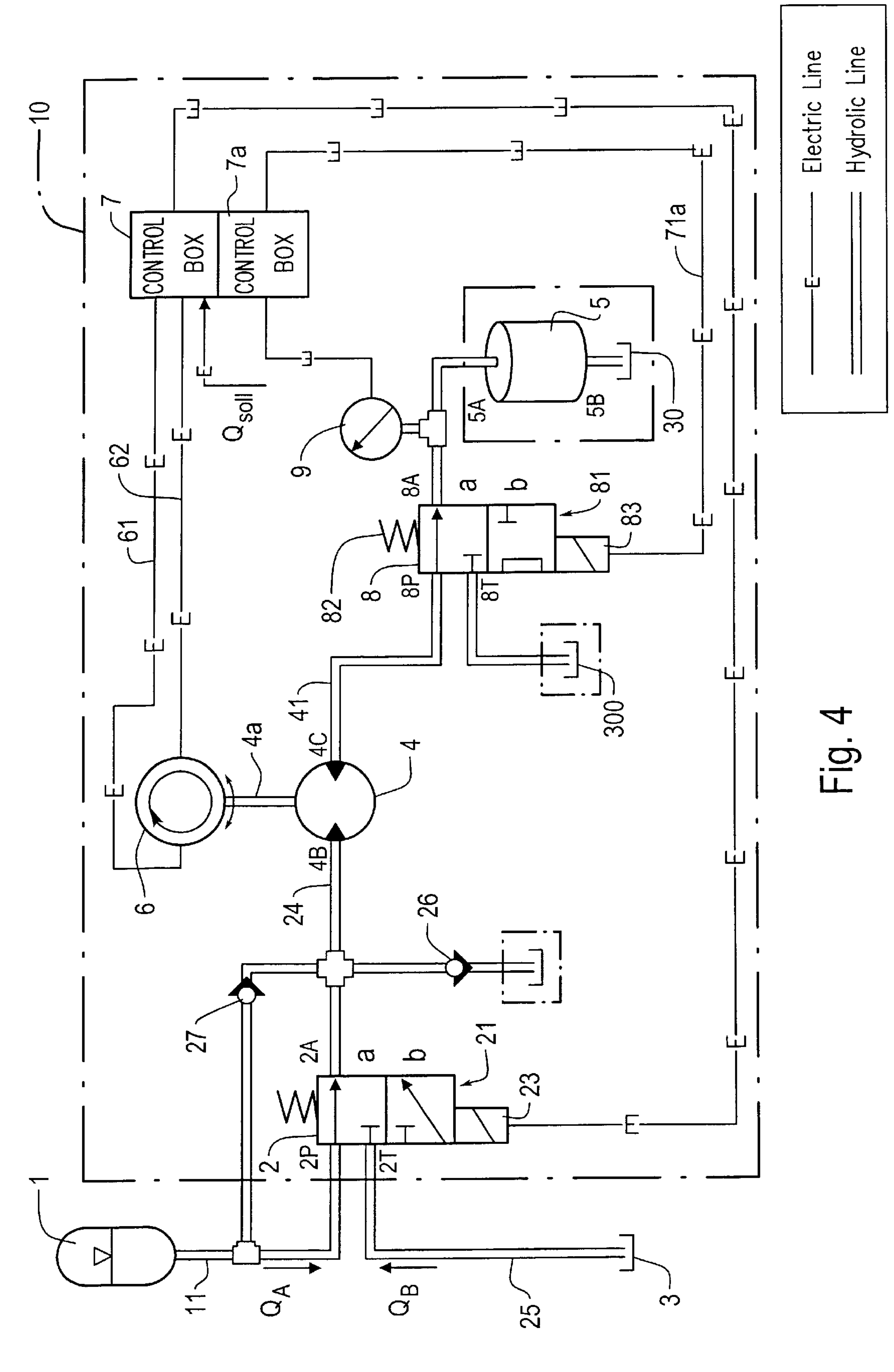

Preferred embodiments of the invention shall be explained in the following by referring to the drawings, wherein:

FIG. 1 shows a hydraulic drive system including a hydro-transformer corresponding to a first embodiment of the present invention, FIGS. 2(*a*) to 2(*d*) are graphic representations of the operation of a hydro-transformer corresponding to the first embodiment of the present invention over time, wherein the switching position of a first switching valve, the torque of a hydrostatic motor, the rotational speed of the hydrostatic motor, and the volume flows at the first switching valve in the case of a fluid flow towards the drive member are shown, FIGS. 3(*a*) and 3(*b*) are graphic representations of the operation of a hydro-transformer corresponding to the first embodiment of the present invention over time, wherein the rotational speed of the hydrostatic motor and the switching position of a first switching valve in the case of a fluid flow from the drive member are shown, and FIG. 4 shows a hydraulic drive system including a hydro-transformer, which corresponds to the second embodiment of the present invention.

A first embodiment of a hydro-transformer in accordance with the invention is shown in FIG. 1 as an application in a hydraulic drive system.

The hydro-transformer corresponding to the first embodiment includes a first switching valve 2, a hydraulic machine 4, a sensor 6 and a control means 7.

The switching valve 2 includes a pressure port 2P, a work port 2A, and a drain port 2T, and may assume two switching positions, position a and position b. In switching position a, the pressure port 2P is connected with the work port 2A, whereas in switching position b the work port 2A is connected with the drain port 2T. The control piston 21 is biased into switching position a by a spring 22 and may be switched to switching position b through a lifting magnet 23. Instead of the shown switching valve 2, any valve means may be used wherein a pressure port and a work port, or the work port and a reservoir port, respectively, may optionally be connected within a short time.

The hydraulic machine 4 of the present embodiment is a fixed displacement motor having two volume flow directions and two directions of rotation, and includes a first port 4B and a second port 4C. It is, however, possible to utilize any hydrostatic motor having at least one volume flow direction and one direction of rotation if no energy recovery is to be performed. Work port 2A of the switching valve 2 is connected with the first port 4B of the hydraulic machine 4 through a work line 24.

At the hydraulic machine 4, a sensor 6 measuring a characteristic value for the volume flow in the hydraulic machine 4 is provided. The sensor 6 preferably is a speed indicator fastened to a shaft 4*a* of the fixed displacement motor 4. The electrical output signal of the sensor 6 is transmitted to the control means 7 via electrical lines 61 and 62. The control means 7 compares the electrical output signal of the sensor 6 characterizing the volume flow through the hydraulic machine 4 with a value for the target volume flow $Q_{Soll}$ applied to the control means 7. The target volume flow $Q_{Soll}$ may either be present in a memory of the control means 7 or be predetermined by external means. The output signal from the control means 7 is supplied to the lifting magnet 23 of the switching valve 2 via an electrical line 71.

In the following, the external configuration of a hydro-transformer corresponding to the first embodiment of the invention shall be explained by referring to FIG. 1.

The pressure port 2P of the switching valve 2 in the above described hydro-transforming 10 is hydraulically connected, through a a pressure line 11, to a hydrostatic accumulator 1 with a gas bias. The hydrostatic accumulator may, as an alternative, be any other system having an impressed pressure. The volume flow from the hydrostatic accumulator 1 to the pressure port 2P is designated by $Q_A$ in FIG. 1. The drain port 2T of the switching valve 2 is connected with a reservoir 3 via a first drain line 25. The volume flow from reservoir 3 to the drain port 2T is designated by $Q_B$ in FIG. 1.

The second port 4C of the hydrostatic motor 4 of the hydro-transformer 10 is connected with a first port 5A of a drive member 5 by way of a second work line 41. The drive member 5 is, e.g., a cylinder with a unilaterally acting load. The second port 5B of the drive member 5 is connected with a reservoir 30 via a second drain line 51.

The external configuration of the hydro-transformer is, however, not restricted to the represented form but only has to satisfy the following basic conditions: there should be the possibility of a higher pressure being present at pressure port 2P than at drain port 2T, and a load must be connected to the second port 4C of the hydraulic machine 4.

In order to avoid cavitations or pressure peaks in the line 24 during the finite switching times of the switching valve 2, a check valve 26 between the line 24 and a reservoir not designated in FIG. 1, and a check valve 27 between the line 24 and the hydrostatic accumulator 1 are provided.

The operation of the hydro-transformer corresponding to the first embodiment of the present invention shall now be described by referring to FIGS. 2(*a*) to 2(*d*), FIGS. 3(*a*), 3(*b*), and FIG. 1. Herein a cylinder with a unilaterally acting load is used as the drive member by way of example.

a) For extension of the cylinder, a target value $Q_{Soll}$ for the volume flow is initially input to the control means 7, and the switching valve 2 is taken into switching position a in accordance with the representation of FIGS. 1 and 2(*a*). Thus fluid may enter from the hydrostatic accumulator 1 and the switching valve 2 into the hydraulic machine 4, the torque M of which temporarily rises to then remain on a constant level in accordance with the representation of FIG. 2(*b*), and the rotational speed n of which rises continuously. The volume flow $Q_A$ from the hydrostatic accumulator 1 to the switching valve 2 increases in accordance with the representation of FIG. 2(*d*). The fluid arrives from the hydraulic machine 4 in the cylinder which extends.

Based on the rotational speed n detected with the aid of the sensor 6, the actual volume flow $Q_{ist}$ is determined in the control means 7 by using parameters of the hydraulic machine 4 and compared to the predetermined target volume flow $Q_{Soll}$. When the actual volume flow $Q_{ist}$ attains this predetermined target volume flow $Q_{Soll}$, an electrical signal is supplied to the lifting magnet 23 of the switching valve 2, whereby the switching valve 2 is taken into switching position b in accordance with the representation in FIG. 2(*a*). As a result, the torque of the hydraulic machine 4 drops steeply and the rotational speed n thereof reduces continuously in accordance with the representation of FIGS. 2(*b*) and 2(*c*). At the same time, the volume flow $Q_B$ from the reservoir 3 to the drain port 2T of the switching valve 2 reduces in accordance with the representation of FIG. 2(*d*). Where the actual volume flow $Q_{ist}$ in the hydraulic machine now becomes lower than a value depending on the target volume flow $Q_{Soll}$, such as, e.g., 95% of the target volume flow $Q_{Soll}$, the control means 7 again switches the lifting magnet 23 of the switching valve 2 into switching position a. The above described control is subsequently repeated.

If, for example, a pressure of 20 MPa is present in the hydrostatic accumulator and a pressure of, e.g., 5 MPa acts on the cylinder for lifting the piston, the latter may then be extended independently of the current load on the cylinder at a constant velocity which is predetermined in the form of the target volume flow $Q_{Soll}$.

b) Upon retraction of the cylinder, the switching valve 2 is taken into switching position b in accordance with the representation of FIG. 3(*b*). As a result, fluid flows from the cylinder towards the reservoir 3 via the hydrostatic motor 4 driven in the direction opposite to the one of the previous case and via the switching valve 2. The negative rotational speed −n of the hydraulic machine increases continuously in accordance with the representation of FIG. 3(*a*), with the cylinder being retracted.

Where the negative actual volume flow measured with the aid of the sensor 6 exceeds a predetermined value which may be the negative target volume flow $Q_{Soll}$ or another input volume flow for retraction, the switching valve 2 is taken into switching position A in accordance with the representation of FIG. 3(*a*). As a result, fluid from the cylinder arrives in the hydrostatic accumulator 1. When the actual volume flow measured with the aid of the sensor 6 drops below a predetermined level which depends on the predetermined value, such as, e.g., 95% of the predetermined value, the switching valve 2 is again taken into switching position b.

As a result, fluid may be conveyed from the cylinder exhibiting a relatively low pressure into a hydrostatic accumulator 1 exhibiting a relatively high pressure. Thus energy recovery takes place upon retraction of the cylinder. Correspondingly, the hydro-transformer according to the first embodiment may be used effectively in mobile hydraulics. The low expenditure in terms of apparatus technology in the hydro-transformer corresponding to the first embodiment as compared with the prior art allows to expand possible applications of hydro-transformers.

In order to convert a low pressure at the drive member into a high pressure at the hydrostatic accumulator, it is necessary to leave the first switching valve 2 in switching position b for a longer period relative to the respective overall switching period. For example the pressure at the drive member is 5 MPa, whereas a pressure of 20 MPa prevails in the hydrostatic accumulator 1. In this case it is favorable to leave the switching valve in switching position b during ¾ of the overall switching period.

One precondition for operation of the hydro-transformer according to the first embodiment is the pressure in the hydrostatic accumulator to always be higher than the pressure in the drive member 5. A case may, however, also occur in which a pressure above the pressure in the hydrostatic accumulator is required at the drive member. For this case the second embodiment according to the invention was provided.

FIG. 4 shows a hydraulic drive system which includes a hydro-transformer according to the second embodiment of the present invention.

The hydro-transformer 10 according to the second embodiment differs from the one according to the first embodiment in that a second switching valve 8 is provided between the second port 4C of the hydraulic machine 4 and the first port 5A of the drive member 5. This switching valve 8 comprises a pressure port 8P', a work port 8A and a drain port 8T. The pressure port 8P' is hydraulically connected with the second port 4C of the hydraulic machine 4 via a work line 41. The work port 8A is hydraulically connected with the first port 5A of the drive member 5 via a work line 84. The drain port 8T is hydraulically connected with a reservoir 300.

The second switching valve 8 has a switching position a wherein the pressure port 8P is hydraulically connected with the work port 8A, and a switching position b wherein the pressure port 8P is hydraulically connected with the drain port 8T. A control piston 81 of the second switching valve 8 is biased by means of a spring 82 and moved through actuation of a lifting magnet 83 of the switching valve 8.

The pressure in the work line 84 is measured with the aid of a pressure gauge 9, with the electrical output signal of this pressure gauge being transmitted to another control means 7*a* which may be formed so as to share a housing with the control means 7. The control means 7*a* is connected with the lifting magnet 83 of the second switching valve 8 via an electrical line 71*a*.

The basic construction and the basic operation of the other components of the hydro-transformer 10 of the second embodiment correspond to those of the hydro-transformer 10 of the first embodiment and shall therefore not be described in detail hereinbelow.

The following is an explanation of the meaning of the second switching valve 8 in operation of the hydro-transformer 10.

a) If a cylinder acting as a drive member, in which a relatively high pressure such as e.g. 20 MPa is required, is to be extended with a relatively low pressure such as e.g. 5 MPa in the hydrostatic accumulator 1, the second switching valve 8 is first taken into switching position b wherein the pressure port 8P is hydraulically connected with the drain port 8T. As a result, a particular rotational speed manifests at the hydraulic machine 4. Now the second switching valve 8 is taken into switching position a through the lifting magnet 83 being correspondingly controlled by the further control means 7*a* in dependence on a specific parameter such as, e.g., lapse of a predetermined time period, or a specific actual volume flow being attained in the hydraulic machine 4'. Hereby fluid is supplied to the drive member 5. When the pressure measured through the pressure gauge 9 or the differential quotient of this pressure becomes lower than a predetermined value, the second switching valve 8 is switched back into switching position b by controlling the lifting magnet 83. Subsequently the above described switching into switching position a is repeated. As a result, the cylinder extends at a constant velocity as a result of a pressure in the hydrostatic accumulator which is lower than the load pressure.

b) Upon retraction of the cylinder, control of the second switching valve 8 is effected by the further control means 7*a* in such a way that the pressure at the first port 5A of the drive member is higher than the pressure at work port 2A of the first switching valve 2. This may be achieved either in that a particular stored switching behavior of the second switching valve 8 is retrieved from the control means 7*a* for specific pressure values at the pressure gauge 9, or in that the pressure in at least one of the hydraulic lines 11', 24 and 41 is measured, then evaluated in the control means 7*a* and used for actuation of the lifting magnet 83. Actuation of the first switching valve 2 takes place in the same way as upon retraction of the cylinder provided at a hydro-transformer corresponding to the first embodiment. As a result, a predetermined pressure may be applied to the hydrostatic accumulator 1, and a predetermined volume flow may be supplied, making deliberate energy recovery possible.

In the case of low volume flows at the drive member, strong pulsation may occur at the load of the drive member due to switching of the switching valves in accordance with the first and second embodiments. On the other hand, switching losses are created at the switching valves.

In order to reduce pulsation at the load at volume flows below a predetermined value, it has been found value, the clock frequency should be decreased below a predetermined clock frequency while the lifting magnet is being controlled. The predetermined value for the volume flow and the values for the clock frequency herein are either standardly present in the corresponding control means or were entered into it prior to the respective operation of the hydraulic drive system.

In order to increase the amount of recovered energy and secure uniform running of the hydraulic machine, the hydro-transformers according to the first and second embodiments may be modified in the manner explained below.

It is possible to variably couple a mass to the shaft of the hydraulic machine corresponding to the first or second embodiment. This increases the resistance with which the hydraulic machine counteracts a change of the moving condition of its shaft. Although this deteriorates the start-up behavior of the hydraulic machine, on the other hand it attenuates variations in rotational speed, whereby a more balanced extension of a cylinder used as a drive member, and effective recovery of energy during retraction of the cylinder are ensured.

The invention thus furnishes hydro-transformers enabling load-independent volume flow stabilization at low expenditure in terms of apparatus technology, as well as energy recovery. In the second embodiment, load pressures higher than the reservoir pressure may additionally be realized.

The present invention thus relates to a hydro-transformer including a hydraulic machine, a switching valve and a control means. A work port of the switching valve, which may optionally be connected hydraulically with a pressure port of the switching valve or a drain port of the switching valve, is connected with a first port of the hydraulic machine. The second port of the hydraulic machine is in hydraulic connection with a drive member. The switching valve is driven by the control means in response to a signal characterizing the volume flow into the hydraulic machine. Where the drive member is a cylinder, its extension may be carried out at a constant velocity and independent of load, and energy may be recovered upon retraction. Due to the provision of a further switching valve between the second port of the hydrostatic motor and the drive member, a higher pressure may be generated at the drive member in the presence of a low pressure at the pressure port of the switching valve.

What is claimed is:

1. Hydro-transformer (10) including a switching valve (2) comprising a pressure port (2P) and a work port (2A), wherein the hydraulic connection between said pressure port (2P) and said work port (2A) is switchable, a hydraulic machine (4) having a first port (4B) hydraulically connected with the work port (2A) of said switching valve (2) and a second port (4C) capable of being hydraulically connected with a drive member (5), and a control means (7) whereby said switching valve (2) may be driven in accordance with a measured characteristic value characterizing a volume flow of said hydraulic machine (4).

2. Hydro-transformer (10) according to claim 1, wherein a check valve (27) is provided between said work port (2A) and said pressure port (2P).

3. Hydro-transformer (10) according to claim 1 or 2, wherein said switching valve (2) may be controlled by said control means (7) in such a way that the measured characteristic value remains substantially constant.

4. Hydro-transformer (10) according to claim 1, wherein the measured characteristic value is the rotational speed of said hydraulic machine (4).

5. Hydro-transformer (10) according to claim 1, wherein said switching valve (2) may be switched between a first switching position (a) in which said pressure port (2P) is hydraulically connected with said work port (2A), and a second switching position (b) in which said work port (2A) is hydraulically connected with a drain port (2T) of said switching valve (2).

6. Hydro-transformer (10) according to claim 1, wherein a check valve (26) is provided between work port (2A) and drain port (2T).

7. Hydro-transformer (10) according claim 1, wherein said hydraulic machine (4) presents two volume flow directions and two directions of rotation.

8. Hydro-transformer (10) according to claim 5 wherein said hydraulic machine (4) presents two volume flow directions and two directions of rotation and wherein in a case in which a volume flow from said hydraulic machine (4) to said switching valve (2) is present, a first period time in which said switching valve (2) is in the first switching position (a), is shorter than a second period time wherein said switching valve (2) is in the second switching position (b).

9. Hydro-transformer (10) according to claim 1 wherein said second port (4C) of said hydraulic machine (2) is hydraulically connected with a pressure port (8P) of a further switching valve (8), and a work port (8A) of said further switching valve (8) is hydraulically connected with said drive member (5), and wherein the hydraulic connection between said pressure port (8P) and said work port (8A) of said further switching valve (8) is switchable by the latter in accordance with the pressure at work port (8A).

10. Hydro-transformer (10) according to claim 9, wherein said further switching valve (8) may be switched to a first switching position (a) wherein said pressure port (8P) of said further switching valve (8) is hydraulically connected with said work port (8A) thereof, and a second switching position (b) wherein said pressure port (8P) of said further switching valve (8) is hydraulically connected with a drain port (8T) thereof.

11. Hydro-transformer (10) according to claim 10, wherein the clock frequency of said further switching valve (8) is greater than a predetermined clock frequency in the case of a volume flow at pressure port (8P) thereof, which is lower than a predetermined volume flow, and is lower than a predetermined clock frequency in the case of a volume flow at the pressure port (8P) thereof which is greater than a predetermined volume flow.

12. Hydro-transformer (10) according to claim 1, wherein a mass may optionally be coupled with a shaft (4*a*) of said hydraulic machine (4).

13. Hydro-transformer (10) according to claim 1, which is employed in mobile hydraulics.

* * * * *